Sept. 6, 1966
L. A. McNEELY
3,270,516
ABSORPTION REFRIGERATION
Filed March 30, 1965
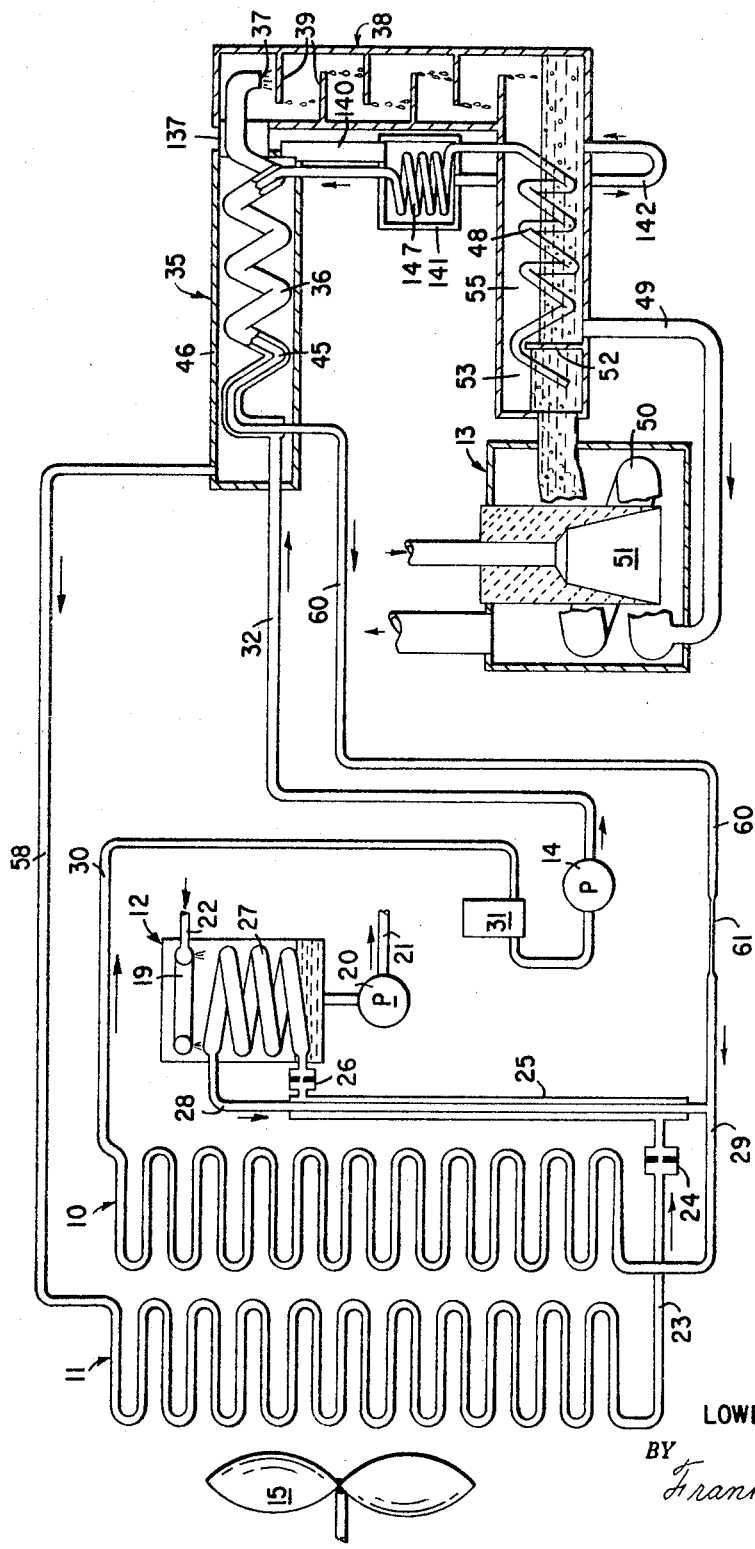
INVENTOR.
LOWELL A. MCNEELY.
BY
Frank N. Decker Jr.
ATTORNEY.

United States Patent Office 3,270,516
Patented Sept. 6, 1966

3,270,516
ABSORPTION REFRIGERATION
Lowell A. McNeely, Indianapolis, Ind., assignor to Carrier Corporation, Syracuse, N.Y., a corporation of Delaware
Filed Mar. 30, 1965, Ser. No. 443,803
7 Claims. (Cl. 62—101)

This invention relates to absorption refrigeration, and more particularly to absorption refrigeration systems of the type employing a rectifier for enriching the refrigerant content of vapor formed in the generator.

It has been frequent prior practice to provide a rectifier and an analyzer in absorption refrigeration systems of the type employing water as an absorbent and ammonia as a refrigerant for enriching the refrigerant content of vapor passing from the generator to the condenser. In such systems the analyzer is employed to effect mass and heat transfer between vapor formed in the generator and weak solution passing from the absorber to the generator. Vapor from the analyzer is then passed to a rectifier where its refrigerant content is further enriched by condensing absorbent from the vapor by passing the vapor in heat exchange with weak solution. The enriching process carried on in the rectifier results in the formation of condensate, which contains a substantial quantity of refrigerant dissolved therein.

In accordance with this invention, the rectifier condensate is passed through a heat exchanger, in heat exchange relation with strong solution passing from the generator to the absorber, to boil the rectifier condensate and produce vapor. The vapor produced from the rectifier condensate is then passed to the rectifier, along with the vapor from the analyzer, where its refrigerant content is enriched and from which it is passed to the condenser. Thus, an improvement in overall thermodynamic efficiency is achieved by utilizing the heat of the strong solution to vaporize refrigerant from the rectifier condensate.

In the preferred embodiment of this invention it is also an objective to keep the total height of the absorption refrigeration machine as small as possible. A factor in determining the height of an absorption machine is the height of the analyzer column. If it is also necessary to place the rectifier above the analyzer in order to drain the rectifier condensate into the analyzer or to some other location, the height of the machine may be undesirably increased. In the illustrated embodiment of this invention, the rectifier is disposed substantially below the top of the analyzer column. Since this construction does not permit the rectifier condensate to be drained into the top of the analyzer, a separate rectifier condensate heat exchanger is disposed below the rectifier and adjacent the analyzer. Strong solution from the generator is passed through the rectifier condensate heat exchanger in heat exchange with condensate therein, thus boiling the condensate and forming vapor. The rectifier condensate is then passed through a vapor trap to the generator. The vapor trap prevents the passage of vapor from the generator into the rectifier condensate heat exchanger. The vapor formed in the rectifier condensate heat exchanger is passed into the rectifier where it passes along with vapor from the analyzer to the condenser.

Other features and objects of this invention will become more readily apparent by referring to the following specification and attached drawing therein the figure is a schematic flow diagram of an absorption refrigeration system embodying this invention.

Referring particularly to the drawing, there is shown an absorption refrigeration system having an absorber 10, a condenser 11, an evaporator 12, and a generator 13 connected to provide refrigeration. A pump 14 is employed to circulate weak absorbent solution from absorber 10 to generator 13. As used herein, the term "weak absorbent solution" refers to a solution which is weak in absorbing power, and the term "strong absorbent solution" refers to a solution which is strong in absorbing power. A suitable absorbent solution for use in the system described is water, and a suitable refrigerant is ammonia. For convenience, the absorbent liquid will be referred to as an "absorbent solution" although it will be appreciated that pure water is not technically a solution.

A chilled water pump 20 is provided for forwarding water, or other heat exchange medium chilled in evaporator 12, through chilled water line 21 to a suitable remote location for chilling a refrigeration load. The water is then returned through chilled water line 22 to a spray header 19 from which it is distributed over the exterior of evaporator coil 27.

Liquid refrigerant is passed from condenser 11 through liquid line 23, refrigerant restriction 24, the exterior passage of liquid suction heat exchanger 25 and second refrigerant restriction 26, to evaporator coil 27 of evaporator 12. Heat from the water to be chilled, passing over the exterior of evaporator coil 27, is given up to the refrigerant which vaporizes in the interior of the evaporator coil. The refrigerant vapor passes from coil 27 through vapor line 28, the interior passage of liquid suction heat exchanger 25, to mixing line 29 where it is mixed with strong solution returning to the absorber from the generator.

The mixture of refrigerant vapor and strong solution passes through mixing line 29 into the heat exchange coil which forms absorber 10. Air is passed over the exterior of the absorber coil by fan 15 to cool absorbent solution therein and increase its absorbing power. The absorbent solution is weakened as it absorbs refrigerant vapor during its passage through the absorber. By the time the absorbent solution reaches the discharge end of the absorber coil, the refrigerant vapor is completely absorbed in the absorbent solution and the solution has become weak in absorbing power by the absorption of the vapor.

The weak absorbent solution passes through weak solution line 30 to a purge tank 31 where noncondensible gases are collected and withdrawn from the system. The weak solution is then forwarded by solution pump 14 through weak solution line 32 to combined rectifier and heat exchanger section 35.

Rectifier and heat exchanger section 35, in the preferred embodiment of this invention, comprises an outer shell 46 forming a vapor passage. Shell 46 contains an inner heat exchange coil 45 and a concentric outer heat exchange coil 36, as shown in the drawing. Preferably, outer heat exchange coil 36 is spirally disposed along the inner wall of shell 46 and it may be provided with suitable fins for enhancing heat transfer.

Coils 36 and 45 form a solution heat exchanger between the entire quantity of relatively hot strong solution passing from the generator to the absorber and the entire quantity of relatively cool weak solution passing from the absorber to the generator. The amount of heat transfer surface provided between the strong and weak solution is designed so that the weak solution is brought to just about its boiling point so that vapor is not formed in the solution heat exchanger.

The weak solution from line 32 passes through coil 36, in the annular space between inner heat exchange coil 45 and outer heat exchange coil 36 where the weak solution is heated to substantially its boiling point by heat exchange with strong solution. After passing through coil 36, the heated weak solution is discharged from opening 37 onto one of a plurality of baffles or plates 39 in analyzer column 38.

Analyzer 38 comprises a tubular member having a plurality of plates 39 which provide surfaces for contact of vapor with the returning weak solution which wets the surfaces of the plates. The weak solution passes successively over the plurality of plates and is discharged from the bottom of the analyzer into a generator reservoir 40. Generator reservoir 40 provides solution storage for part load operation conditions and allows for solution and refrigerant charging tolerance, and compensates for manufacturing variations in machine volume.

Weak solution from generator reservoir 40 passes through line 49 into generator coil 50. The solution in coil 50 is heated by suitable means such as gas burner 51 causing the solution to boil thereby forming vapor. The vapor and hot solution is discharged from coil 50 into separation chamber 53, formed by a baffle or weir 52, where the vapor separates from the remaining strong solution. Preferably, some of the solution normally spills over the top of baffle 52 and is recirculated through line 49 to generator coil 50. It will be understood that the solution in separation chamber 53 has been concentrated by vaporizing refrigerant therefrom in generator 13.

Vapor formed in generator 13 passes concurrently with strong solution through vapor passage 55 formed in the upper portion of generator reservoir 40, through analyzer 38, and through the vapor passage 137, and the vapor passage formed by shell 46 of rectifier 35 to condenser 11.

The concentrated or strong absorbent solution from separation region 53 is at the relatively high generator pressure and passes through heat exchange coil 48 in generator reservoir 40, a heat exchange coil 147, and inner heat exchange coil 45 in the rectifier. The strong solution then passes through line 60 and restriction 61 into line 29 and absorber 10 on the relatively low pressure side of the system.

Heat from the strong solution passing through coil 48 boils the weak solution in the generator reservoir to vaporize refrigerant therefrom.

A portion of coil 48 is submerged below the level of weak solution in reservoir 40 and another portion of the coil is disposed in the vapor passage above the weak solution. The boiling of the weak solution causes the portion of coil 48 which is disposed in vapor passage 55 to be wetted with solution. As the strong solution passes through coil 48, it becomes progressively cooler. Vapor formed in the generator and in the reservoir passes through vapor passage 55 and contacts the exposed wetted portion of coil 48 in reservoir 40, and mass and heat transfer take place with the weak solution boiling in the reservoir. It will be appreciated that ammonia vapor will be boiled from the weak solution in the reservoir and that water vapor will be condensed from the vapor space into the weak solution in proportions resulting in an enrichment of the refrigerant content of the vapor passing through the reservoir. Also, the condensation of water vapor into the weak solution will liberate additional heat which assists in vaporizing the solution.

Similarly, as the vapor passes from the reservoir upwardly through analyzer column 38, a mass and heat transfer takes place between the weak solution passing downwardly over plates 39 in the column and further enriches the refrigerant content of the vapor.

The vapor then passes through line 137 into rectifier 35 where it is placed in heat exchange relation with the weak solution passing through coil 36. The heat transfer which takes place in the rectifier results in condensing water from the vapor which then leaves the rectifier in a highly purified or enriched state.

The purified refrigerant vapor passes from rectifier 35 through line 58 into the coil of condenser 11. Fan 15 passes air over condenser 11 causing the refrigerant vapor to condense. The condensed refrigerant passes through line 23 and restriction 24 into evaporator 12, as previously explained.

In accordance with this invention, the heat of the strong solution, after it has passed through the generator reservoir 40 but prior to its passage to the solution heat exchanger 36, 45, is used to boil rectifier condensate so as to provide a gain in cycle efficiency while minimizing overall heat transfer surface requirements. This gain in efficiency is realized by the vaporization of ammonia refrigerant from the rectifier condensate during its passage through a rectifier condensate heat exchanger 141 in heat exchange relation with strong solution passing through coil 147.

The arrangement shown in the drawing is particularly advantageous where it is designed to minimize the total height of the absorption refrigeration machine by locating rectifier 35 at substantially the same level as, or below, the top of analyzer column 38. Under these circumstances, the reflux or condensate formed in the rectifier cannot drain into the top of the analyzer column by gravity. While this condensate could be injected into the analyzer column at the level of the lower plates therein, some system efficiency would be lost. Accordingly, a separate rectifier condensate heat exchanger 141 is employed. Rectifier condensate heat exchanger 141 is disposed below the level of rectifier 35 and adjacent analyzer 38. Strong solution from coil 48 is passed through a heat exchange coil 147 in rectifier condensate heat exchanger 141. The strong solution passes from coil 147 into inner coil 45 of rectifier 35. Condensate from rectifier 35 passes through line 140 into heat exchanger 141. Ammonia vapor is boiled from the rectifier condensate in heat exchanger 141 by the heat imparted to the condensate from strong solution passing through coil 147. The condensate then passes through vapor trap 142 into the bottom of generator reservoir 40 to generator 13. The ammonia vapor formed by boiling the rectifier condensate in heat exchanger 141 passes upwardly through line 140 into rectifier 35 where it passes along with vapor formed in analyzer 38 and is enriched by heat transfer with weak solution in coil 36. The vapor is then discharged from rectifier 35 through line 58 and condensed in condenser 11. Trap 142 permits the rectifier condensate, after having been boiled in heat exchanger 141, to be discharged into generator reservoir 40, and trap 142 is filled with liquid which provides a vapor seal that prevents vapor from generator 13 and generator reservoir 40 from entering rectifier heat exchanger 141.

It will be seen that the practice of this invention achieves the objects of providing a thermodynamically, efficient, absorption refrigeration system, and at the same time minimizing the height of the rectifier and analyzer assembly and the heat exchange surface requirements.

While a preferred embodiment of this invention has been described for purposes of illustration, it will be appreciated that this invention may be otherwise embodied within the scope of the following claims.

I claim:
1. An absorption refrigeration system comprising:
 (A) an absorber for absorbing refrigerant vapor;
 (B) an evaporator for evaporating refrigerant and providing a cooling effect;
 (C) a generator for concentrating weak absorbent solution by vaporizing refrigerant therefrom;
 (D) a condenser for condensing refrigerant vaporized in said generator;
 (E) an analyzer for passing vapor from said generator to said rectifier in mass and heat transfer relation with weak absorbent solution to enrich the refrigerant content of said vapor prior to its passage to said rectifier;
 (F) a rectifier for passing vapor in heat exchange relation with relatively cool weak solution to enrich the refrigerant content of said vapor by condensing absorbent therefrom; and
 (G) a rectifier condensate heat exchanger, said rectifier condensate heat exchanger being connected to receive rectifier condensate formed in said rectifier and to pass said condensate to said generator in heat exchange relation with strong solution passing from said generator to said absorber, and to pass vapor formed in said rectifier condensate heat exchanger to said rectifier.

2. An absorption refrigeration system comprising:
(A) an absorber for absorbing refrigerant vapor;
(B) an evaporator for evaporating refrigerant and providing a cooling effect;
(C) a generator for concentrating weak absorbent solution by vaporizing refrigerant therefrom;
(D) a condenser for condensing refrigerant vaporized in said generator;
(E) a rectifier for passing vapor in heat exchange relation with relatively cool weak solution to enrich the refrigerant content of said vapor by condensing absorbent therefrom;
(F) an analyzer for passing vapor from said generator to said rectifier in mass and heat transfer relation with weak absorbent solution to enrich the refrigerant content of said vapor prior to its passage to said rectifier; and
(G) a rectifier condensate heat exchanger comprising:
(1) a shell member enclosing a heat exchanger,
(2) a passage for passing both rectifier condensate from said rectifier into said shell and vapor from said shell into said rectifier,
(3) passage means for passing rectifier condensate from said shell member to said generator, said passage means including a vapor trap to prevent passage of vapor from said generator into said shell member, and
(4) passage means for passing strong solution from said generator to said absorber in heat exchange relation with rectifier condensate in said shell member, thereby forming vapor in said shell member.

3. An absorption refrigeration system comprising:
(A) an absorber for absorbing refrigerant vapor;
(B) an evaporator for evaporating refrigerant and providing a cooling effect;
(C) a generator for concentrating weak absorbent solution by vaporizing refrigerant therefrom;
(D) a condenser for condensing refrigerant vaporized in said generator;
(E) an analyzer for passing vapor from said generator to said rectifier in mass and heat transfer relation with weak absorbent solution to enrich the refrigerant content of said vapor prior to its passage to said rectifier;
(F) a rectifier for passing vapor in heat exchange relation with relatively cool weak solution to enrich the refrigerant content of said vapor by condensing absorbent therefrom, said rectifier being substantially disposed below the level of the top of said analyzer;
(G) a rectifier condensate heat exchanger disposed adjacent said analyzer and below the level of said rectifier, said rectifier condensate heat exchanger being connected to pass condensate formed in said rectifier in heat exchange relation with strong solution passing from said generator to said absorber, and said rectifier condensate heat exchange being connected to pass vapor formed in said rectifier condensate heat exchanger to said rectifier.

4. An absorption refrigeration system comprising:
(A) an absorber for absorbing refrigerant vapor;
(B) an evaporator for evaporating refrigerant and providing a cooling effect;
(C) a generator for concentrating weak absorbent solution by vaporizing refrigerant therefrom;
(D) a condenser for condensing refrigerant vaporized in said generator;
(E) a rectifier for passing vapor in heat exchange relation with relatively cool weak solution to enrich the refrigerant content of said vapor by condensing absorbent therefrom;
(F) an analyzer for passing vapor from said generator to said rectifier in mass and heat transfer relation with weak absorbent solution to enrich the refrigerant content of said vapor prior to its passage to said rectifier; and
(G) a rectifier condensate heat exchanger comprising:
(1) a shell member enclosing a heat exchanger,
(2) passage means for passing condensate formed in said rectifier into said shell member,
(3) passage means for passing strong solution from said generator to said absorber in heat exchange with rectifier condensate in said shell member, thereby forming vapor in said shell member,
(4) passage means for passing vapor formed in said shell member to said rectifier,
(5) passage means for passing rectifier condensate from said shell member to said generator, and
(6) means to prevent passage of vapor from said generator to said rectifier condensate heat exchanger.

5. An absorption refrigeration system comprising:
(A) an absorber for absorbing refrigerant vapor;
(B) an evaporator for evaporating refrigerant and providing a cooling effect;
(C) a generator for concentrating weak absorbent solution by vaporizing refrigerant therefrom;
(D) a condenser for condensing refrigerant vaporized in said generator;
(E) a rectifier for passing vapor in heat exchange relation with relatively cool weak solution to enrich the refrigerant content of said vapor by condensing absorbent therefrom, thereby forming rectifier condensate;
(F) an analyzer for passing vapor from said generator to said rectifier in mass and heat transfer relation with weak absorbent solution to enrich the refrigerant content of said vapor prior to its passage to said rectifier;
(G) means for passing rectifier condensate in heat exchange relation with strong solution passing from said generator to said absorber to vaporize refrigerant from rectifier condensate; and
(H) means for passing vapor formed from said rectifier condensate to said rectifier.

6. An absorption refrigeration system comprising:
(A) an absorber for absorbing refrigerant vapor;
(B) an evaporator for evaporating refrigerant and providing a cooling effect;
(C) a generator for concentrating weak absorbent solution by vaporizing refrigerant therefrom;
(D) a condenser for condensing refrigerant vaporized in said generator;
(E) a rectifier for passing vapor in heat exchange relation with relatively cool weak solution to enrich the refrigerant content of said vapor by condensing absorbent therefrom, thereby forming rectifier condensate;
(F) an analyzer for passing vapor from said generator to said rectifier in mass and heat transfer relation with weak absorbent solution to enrich the refrigerant content of said vapor prior to its passage to said rectifier;
(G) a rectifier condensate heat exchanger for passing rectifier condensate in heat exchange relation with strong solution passing from said generator to said absorber to vaporize refrigerant from rectifier condensate;
(H) means for passing vapor formed from said rectifier condensate to said rectifier; and
(I) means for preventing passage of vapor from said generator into said rectifier condensate heat exchanger.

7. In a method of operating an absorption refrigeration system having an absorber, an evaporator, a generator, a condenser, a rectifier, and an analyzer, the steps comprising:
  (A) evaporating refrigerant in said evaporator to cool a heat exchange liquid;
  (B) absorbing refrigerant vapor formed in said evaporator in absorbent solution in said absorber;
  (C) boiling weak absorbent solution in said generator to concentrate said absorbent solution and to form vapor;
  (D) passing vapor formed in said generator through said analyzer in mass and heat transfer relation with weak solution passing from said absorber to said generator to enrich the refrigerant content of said vapor;
  (E) passing vapor from said analyzer to said condenser in heat transfer relation with weak solution passing from said absorber to said generator, to further enrich the refrigerant content of said vapor by condensing absorbent therefrom;
  (F) passing vapor from said rectifier to said condenser to condense said vapor;
  (G) passing absorbent condensed in said rectifier in heat exchange relation with strong solution passing from said generator to said absorber to vaporize refrigerant from the condensed absorbent; and
  (H) passing said refrigerant vapor formed from the condensed absorbent to the rectifier for subsequent passage to said condenser.

References Cited by the Examiner
UNITED STATES PATENTS

| | | | |
|---|---|---|---|
| 2,191,551 | 2/1940 | Ullstrand | 62—496 X |
| 2,201,362 | 5/1940 | Bergholm | 62—496 X |
| 2,203,074 | 6/1940 | Anderson | 62—496 X |
| 3,038,321 | 6/1962 | Merrick | 62—495 |

LLOYD L. KING, *Primary Examiner.*